(No Model.) 2 Sheets—Sheet 1.

W. ROBINSON.
ELECTRIC RAILWAY SYSTEM.

No. 566,801. Patented Sept. 1, 1896.

WITNESSES: Jas. W. Ripley. George B. Watson.

INVENTOR: Wm. Robinson.

UNITED STATES PATENT OFFICE.

WILLIAM ROBINSON, OF BOSTON, MASSACHUSETTS.

ELECTRIC-RAILWAY SYSTEM.

SPECIFICATION forming part of Letters Patent No. 566,801, dated September 1, 1896.

Application filed December 19, 1894. Serial No. 532,380. (No model.)

*To all whom it may concern:*

Be it known that I, WILLIAM ROBINSON, a citizen of the United States, residing at Boston, in the county of Suffolk and State of Massachusetts, have invented a new, useful, and Improved Electric-Railway System, of which the following is a specification.

The nature of my invention will be understood from the description which follows, reference being had to the accompanying drawings, which form a part of this specification, in which—

Figure 1:
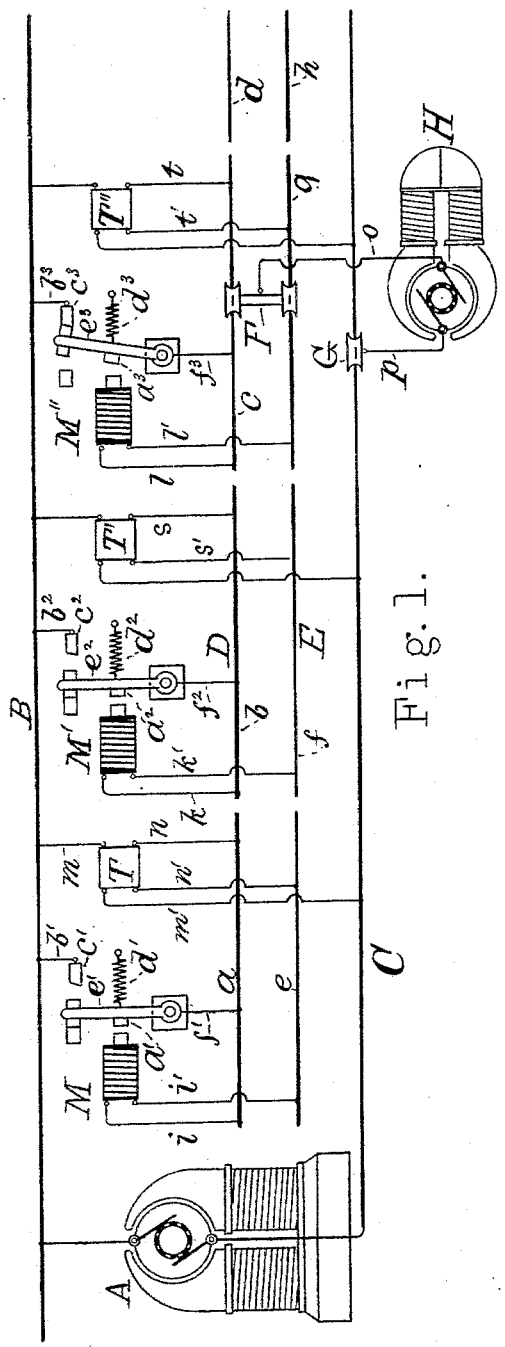
Figure 2:
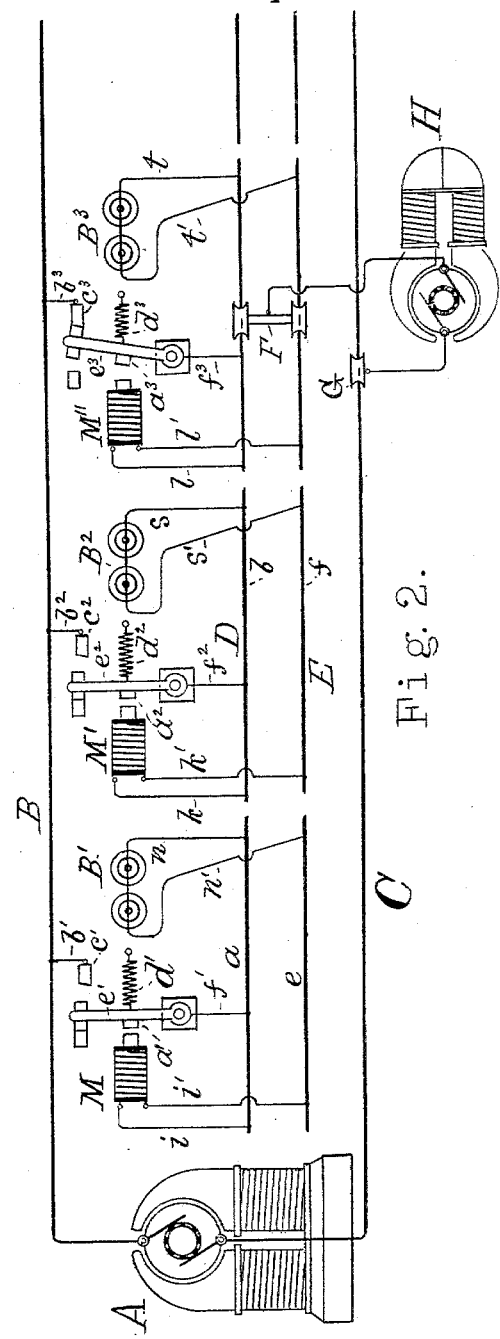
Figure 3:
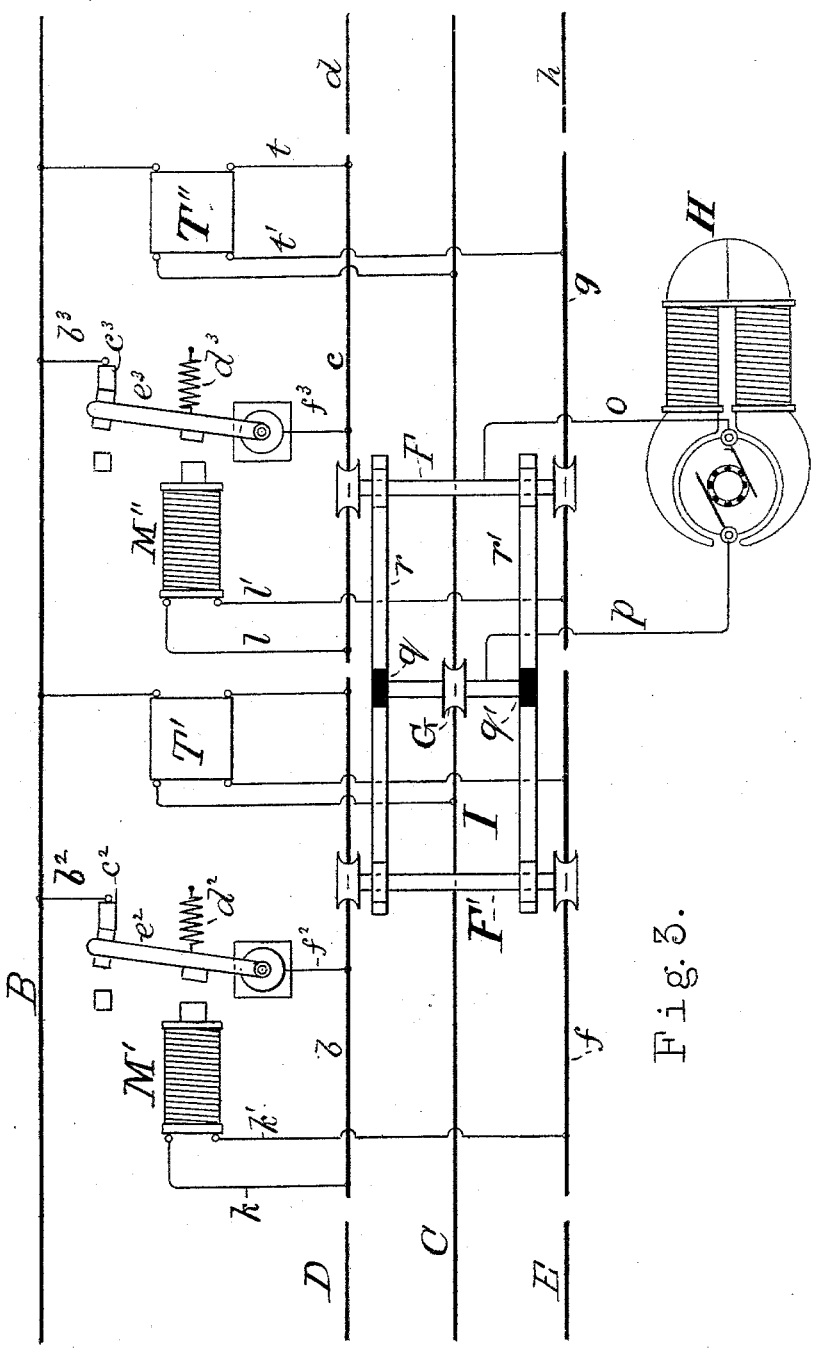

Figure 1 is a diagram illustrating the general principles of my invention and showing the use of transformers in carrying out one part of my invention. Fig. 2 is a similar view, but showing the use of batteries instead of the transformers shown in Fig. 1. Fig. 3 illustrates the operation of the trolley.

A is an electric generator, B a feed-wire proceeding therefrom along the railway, and C the return-conductor, which may consist either of the rails of the track in the usual way, or of a special wire, preferably insulated and suspended or laid in a conduit or elsewhere in any convenient manner.

D is the working conductor, made in successive sections $a\ b\ c\ d$, &c., of any convenient or desired length.

E is an extra conductor, formed in successive sections $e\ f\ g\ h$, &c., parallel and corresponding to the sectional conductors $a\ b\ c\ d$, &c.

The magnet M has its electrodes connected to the sections $a\ e$, preferably at or near one end of said sections, by the conductors $i\ i'$.

The transformer T, of any suitable construction, has its primary circuit connected to the feed-wire B and the return-circuit C by the wires $m\ m'$, as shown, and its secondary circuit to the ends of the conducting-sections $a\ e$ by the wires $n\ n'$. The magnet-connecting wires $i\ i'$ and the transformer-connecting wires $n\ n'$ are connected to opposite ends of the sections $a\ e$. The transformer T is so constructed as to reduce the high primary voltage to a very low voltage, say of five or ten volts, in the secondary circuit. This low-voltage current passing through the sections $a\ e$ and the magnet M keeps the latter magnetized as its normal condition.

The feed-wire B is connected by the wire $b'$ to the anvil $c'$, and when the magnet M is demagnetized the spring $d'$ brings the armature-lever $e'$ against the anvil $c'$, thus connecting the feed-wire B to the working section $a$ through the armature-lever $e'$ and the wire $f'$. In like manner the magnet M' and the secondary circuit of the transformer T' are connected to opposite ends of the conducting-sections $b\ f$ and the magnet M" and the secondary circuit of the transformer T" to opposite ends of the conducting-sections $c\ g$, as shown. As the magnets M M' M" are normally magnetized and thus keep their armatures normally attracted, it is evident that the feed-wire B is normally disconnected from all the working sections $a\ b\ c$, &c.

The trolley F, connected to the car, is constructed in such a way as to make metallic connection in its progress between the conducting-lines D E. Thus, as shown in Figs. 1 and 2, it makes metallic connection between the sections $c$ and $g$. It is evident, then, that in Fig. 1 the metallic connection established between said sectional conductors $c\ g$ short-circuits the current from the transformer T", cutting it off from the magnet M", and thus demagnetizing the same. The spring $d^3$ now withdraws the released lever $e^3$ from the magnet M" and presses said lever against the anvil $c^3$, thus completing the working circuit from the feed-wire B through the conductor $b^3$, anvil $c^3$, armature-lever $e^3$, conductor $f^3$, section $c$, trolley F, conductor $o$, car-motor H, conductor $p$, and trolley G to the return-conductor C. When the conductor C consists of the rails of the track, the conductor $p$ becomes a ground-wire, completing the circuit through the ordinary wheels of the car to the conductor C. That is, the wheels of the car are substituted for the trolley G. The trolley F answers a double purpose—first, to establish a short circuit between the conducting-lines D E, and, secondly, to convey the working current from the sections of the line D to the motor H, as described. It will be observed that as long as the trolley F, while running or standing still, connects the sections $c\ g$ so long will the magnet M" remain demagnetized; but as soon as said trolley leaves the sections $c\ g$ from either end, or if said trolley be accidentally removed, two things happen—first, the high-potential or working current circuit is broken through the interruption of the contact between the trolley F and the section c, and the flow of current therefore ceases across the contact-points at $c^3$; secondly, the short circuit being removed, the low-potential current returns to the magnet $M''$, magnetizing the same. This magnet now attracts its armature $a^3$, and thus opens the contact-points at $c^3$. That is, the feed-wire B is switched out of electrical contact with the conducting-section c.

It will be observed that as all the sections of the working conductor D are out of circuit except the sections directly under the control of passing cars, the exposure to leakage of high-potential current from said line D is confined to leakage from such sections of said line as may be in circuit, as aforesaid, under the control of passing cars. However, the presence of the trolley F, in contact with the section c, for instance, affords a complete metallic circuit, as will be seen by inspection, for the high-potential current, and therefore, under the most unfavorable and exposed conditions, the leakage is practically prevented and imperceptible. The low-potential circuit is always metallic, and there cannot be sufficient current leakage, through the action of the elements, to interfere with the proper working of the apparatus.

In Fig. 2 batteries $B'$ $B^2$ $B^3$ are substituted for the transformers T T' T'', (shown in Fig. 1;) otherwise the circuits, as well as the modes of operation, are identical in the two figures.

In operating the above-described system I prefer to place all the conductors in a conduit, the trolley also, suitably attached to the car, running in the conduit in contact, as described, with the contact-conductors.

In the conduit the wires are arranged in the most convenient relative position. For instance, as shown in Fig. 3, the return-conductor C is placed between the sectional conductors D E.

The trolley-carriage I, Fig. 3, is provided with the trolleys F and F', placed some distance apart and electrically connected by the metal bars $r$ $r'$. The object of thus electrically elongating the trolley-carriage I is to cause the same to overlap and operate each succeeding section before leaving the preceding section, so that there may be no possible interruption in the even flow of the operating-current when the trolley is passing over the joints or sections of the working conductor. The trolley-carriage I is also provided with the trolley-wheel G, mounted in the center of said carriage and insulated therefrom, as shown at $q$ $q'$. The trolley-wheel G, as already described, connects one end of the motor H to the return-conductor C.

It will be observed that the magnetic switches, transformers, batteries, &c., may be located at the most convenient and accessible points and not necessarily within or adjacent to the conduit. In many cases these may be conveniently located on posts by the roadside or on adjacent buildings.

Having thus described my invention, what I claim as new, and desire to secure by Letters Patent, is—

1. In an electric-railway system, the combination, substantially as described, of a feed-wire, the working conductor made in successive sections normally disconnected from said feed-wire, a motor traveling in electrical connection with said working conductor, a circuit continuously closed and an independent electromagnet included therein, said magnet being operated or controlled without actually opening the circuit thereof, the actuation of said magnet operating to connect one of said sections of working conductor to the feed-wire and to disconnect the same therefrom.

2. In an electric-railway system, the combination, substantially as described, of a feed-wire, the working conductor made in successive sections normally disconnected from said feed-wire, a motor traveling in electrical connection with said working conductor, a circuit continuously closed, an independent electromagnet included therein, said magnet being operated or controlled without actually opening the circuit thereof, the actuation of said magnet operating to connect one of said sections of working conductor to the feed-wire and to disconnect the same therefrom, and means for demagnetizing said magnet by short-circuiting.

3. In an electric-railway system, the combination, substantially as described, of a feed-wire, the working conductor made in successive sections normally disconnected from said feed-wire, a car-propelling motor receiving current from said feed-wire through said sections of working conductor, a circuit continuously closed and including a switch-magnet, said switch-magnet controlling the circuit of said motor, and a traveling short-circuiting device arranged to keep said switch-magnet under short circuit while said device is traveling in contact with the circuit including said magnet.

4. The combination, substantially as described, of a feed-wire, the working conductor made in sections normally disconnected from said feed-wire, a traveling motor arranged to receive current from said feed-wire through said sections of working conductor, a continuously-closed circuit including a switch-magnet, the demagnetization of said magnet operating to connect the feed-wire to one of the sections of working conductor, and means for demagnetizing said magnet by short-circuiting.

5. In an electric-railway system, the combination, substantially as described, of a series of successive continuously-closed circuits operated independently of each other, each of said circuits including a magnet operated or controlled without actually opening the circuit of said magnet, and a traveling motor, the circuit of said motor being controlled at successive stages through the demagnetization of said magnets in succession.

6. In an electric-railway system, the combination, substantially as described, of the line or feed wire, the return-conductor, the working conductor formed in successive electrically-disconnected sections, said sections being normally disconnected from said feed-wire and magnets included in continuously-closed circuits operated or controlled without actually opening the circuits of said magnets, the operation of said magnets, respectively, controlling and determining the positions of the respective sections of said working conductor relatively to their connection with or disconnection from said line or feed wire.

7. In an electric-railway system, the combination, substantially as described, of the line or feed wire, the return-conductor, the working conductor formed in successive electrically-disconnected sections, said sections being normally disconnected from said feed-wire and magnets included in continuously-closed circuits operated or controlled without actually opening the circuits of said magnets, the magnetization of said magnets, respectively, disconnecting the respective sections of said working conductor from said line or feed wire.

8. In an electric-railway system, the combination, substantially as described, of the line or feed wire, the return-conductor, the working conductor formed in successive electrically-disconnected sections, and magnets included in continuously-closed circuits formed in part of the respective sections of said working conductor, the operation of said magnets determining and controlling the status of said sections of working conductor relatively to said line or feed wire.

9. In an electric-railway system, the combination, substantially as described, of the line or feed wire, the return-conductor, the working conductor formed in successive electrically-disconnected sections, and magnets included in continuously-closed circuits formed in part of the respective sections of said working conductor and in part of independent conductors, said magnets being actuated or controlled without opening the circuits of the same, the operation of said magnets controlling and determining the position of said sections of working conductor relatively to their connection with said line or feed wire.

10. In an electric-railway system, the combination, substantially as described, of a series of independent continuously-closed circuits, magnets included in and forming parts of said circuits, said magnets being actuated or controlled without actually opening the circuits of the same, a source or sources of electric supply arranged to electrically energize said circuits, and a traveling motor, the circuit of said motor being controlled by said magnets.

11. The combination, substantially as described, of a continuously-closed circuit, a magnet included in said circuit and operated or controlled without actually opening the circuit of said magnet, a transformer arranged to energize said circuit with a current of low voltage derived from a current of higher voltage and means for demagnetizing said magnet by short-circuiting.

12. The combination, substantially as described, of a continuously-closed circuit, a magnet included in said circuit and forming a part of the same, said magnet being operated without actually opening the circuit thereof, a transformer arranged to energize said circuit with a current of low voltage derived from a current of higher voltage, and a traveling motor, the circuit of said motor being controlled by said magnet.

13. The combination, substantially as described, of a continuously-closed circuit including two lines of contact-conductors, a source of electric supply connected to one end of said conductors and an electromagnet connected to the opposite end thereof, the current to said magnet passing through said conductors, a traveling short-circuiting device arranged to demagnetize said magnet by making short-circuiting contact between said contact-conductors, a feed-wire, working conductor and a motor deriving current therefrom, said magnet operating to control the transmission of working current to said motor.

14. The combination, substantially as described, of a series of successive continuously-closed circuits, each including two independent lines of contact-conductors, a source of electric supply connected to one end of each set of contact-conductors independent switch-magnets connected to the opposite ends of said respective sets of conductors, a traveling short-circuiting device arranged to demagnetize said magnets successively by making short-circuiting connection between said respective sets of contact-conductors in succession, a feed-wire, working conductors and a car-propelling motor deriving current therefrom, said switch-magnets in succession operating to control the transmission of working current to said motor at successive stages of its progress.

15. In an electric-railway system, the combination, substantially as described, of the line or feed wire, the working conductor formed in successive sections normally disconnected from said feed-wire, a traveling motor deriving current from said feed-wire through said sectional working conductor, a switch-magnet included in a continuously-closed circuit, means for actuating said magnet by short-circuiting, said magnet operating to control the transmission of working current to said motor, and a common original source of electric supply from which both said traveling motor and said switch-magnet, respectively, derive power.

16. In an electric-railway system, the combination, substantially as described, of the line or feed wire, the working conductor formed in successive sections normally disconnected from each other and from said feed-wire, a traveling motor deriving working current from said feed-wire through said sections of working conductor, a series of switch-magnets included in continuously-closed circuits and operating independently of each other, means for actuating said magnets in succession by short-circuiting, said magnets in succession operating to control the transmission of working current to said motor at successive stages of its progress, and a common original source of electric supply furnishing energy both to said traveling motor and to said switch-magnets respectively.

WILLIAM ROBINSON.

Witnesses:
  LEW. FITCH,
  L. M. FOX.